(12) United States Patent
Norton

(10) Patent No.: US 9,996,122 B2
(45) Date of Patent: Jun. 12, 2018

(54) SOCKET AND ADAPTER

(71) Applicant: Hewlett-Packard Development Company, L.P., Houston, TX (US)

(72) Inventor: John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 64 days.

(21) Appl. No.: 14/905,430

(22) PCT Filed: Jul. 15, 2013

(86) PCT No.: PCT/US2013/050502
§ 371 (c)(1),
(2) Date: Jan. 15, 2016

(87) PCT Pub. No.: WO2015/009277
PCT Pub. Date: Jan. 22, 2015

(65) Prior Publication Data
US 2016/0161995 A1    Jun. 9, 2016

(51) Int. Cl.
*G06F 1/18* (2006.01)
*G06F 13/40* (2006.01)

(52) U.S. Cl.
CPC .............. *G06F 1/184* (2013.01); *G06F 1/183* (2013.01); *G06F 13/409* (2013.01)

(58) Field of Classification Search
CPC ......... G06F 1/183; G06F 1/184; G06F 13/409
See application file for complete search history.

(56) References Cited

U.S. PATENT DOCUMENTS

| | | | |
|---|---|---|---|
| 6,171,139 B1 | 1/2001 | Sata et al. | |
| 6,181,556 B1 | 1/2001 | Allman | |
| 6,261,104 B1 * | 7/2001 | Leman | G06F 1/184 |
| | | | 439/61 |
| 6,916,183 B2 * | 7/2005 | Alger | H05K 1/0263 |
| | | | 439/69 |
| 7,816,779 B2 * | 10/2010 | Braunisch | H01L 25/0657 |
| | | | 257/691 |
| 8,338,713 B2 * | 12/2012 | Fjelstad | H01R 12/523 |
| | | | 174/251 |
| 2006/0003608 A1 | 1/2006 | Sandoval et al. | |
| 2006/0067066 A1 | 3/2006 | Meier et al. | |
| 2007/0072444 A1 | 3/2007 | Okuyama et al. | |
| 2007/0086710 A1 | 4/2007 | Takizawa et al. | |
| 2011/0069443 A1 | 3/2011 | Williams | |

(Continued)

OTHER PUBLICATIONS

International Searching Authority, "The International Search Report and the Written Opinion," dated Apr. 9, 2014, for PCT/US2013/05050209 filed Jul. 15, 2013 10 Pages.

(Continued)

*Primary Examiner* — Hoa C Nguyen
*Assistant Examiner* — Christopher L Augustin
(74) *Attorney, Agent, or Firm* — International IP Law Group, PLLC

(57) ABSTRACT

A motherboard can include a socket coupled to a cable. The motherboard can also include an adapter coupled to a central processing unit (CPU). The adapter can be received in the socket upon installation of the CPU in the motherboard. The socket and the cable can be installed in the motherboard prior to installation of the CPU.

13 Claims, 3 Drawing Sheets

(56) References Cited

U.S. PATENT DOCUMENTS

2012/0081858 A1\* 4/2012 Ganesan ............... H05K 7/00
　　　　　　　　　　　　　　　　　　　　　　　361/729
2012/0120576 A1　5/2012　Weekly

OTHER PUBLICATIONS

Ye, Xiaoning, "Intentional and Un-intentional Far End Crosstalk Cancellation in High Speed Differential Link," (Research Paper), IEEE International Symposium on Electromagnetic Compatibility, Aug. 14-19, 2-11, pp. 791-796.

\* cited by examiner

300

SOCKET AND ADAPTER

CROSS-REFERENCE TO RELATED APPLICATION

Pursuant to 35 U.S.C. § 371, this application is a United States National Stage Application of International Patent Application No. PCT/US2013/050502, filed on Jul. 15, 2013, the contents of which are incorporated by reference as if set forth in their entirety herein.

BACKGROUND

A motherboard is a printed circuit board (PCB) to which main components of a computing device are coupled. Examples of main components include a central processing unit (CPU) and memory. The motherboard can also include connectors for peripheral devices (e.g., I/O devices).

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments disclosed herein provide techniques for installing CPUs in a motherboard. As data transfer rates increase and push the limits of achievable speeds in standard PCBs, the ability to connect high-speed cables directly to central processing units (CPUs) becomes increasingly important. Currently, high speed cables are connected to CPUs via card-edge style connectors. However, because a cable is connected to the CPU before the cable is installed in/routed through a motherboard, components of the motherboard are susceptible to damage caused by installation of the cable. In order to protect the components of the motherboard from this damage, keep-out zones and protective elements are added around the components. These zones and protective elements consume additional space on motherboards. As the size of motherboards decreases with decreasing computing device sizes, the space occupied by keep-out zones and parts to protect the components is undesirable. Further, the limited space available for operators and customers to grasp and manipulate the cable can result in poor connections, as well as damage to the components.

However, by attaching a socket to the cable designed to receive an adapter coupled to the CPU, the cable can be installed in the motherboard before the CPU is installed. The cable can be installed at any time before the CPU is installed, protecting components susceptible to damage by the installation of the cable. Due to pre-installation of the cable in the motherboard, the risk to other motherboard components can be reduced, if not eliminated. Because of this reduction in risk to the components, keep-out zones and protective elements designed to protect the components from damage due to installation of the cable can be reduced or eliminated. This reduction in protective elements and keep-out zones makes more space in the motherboard available or allows for reduction in the overall size of the motherboard.

Figure 1A:
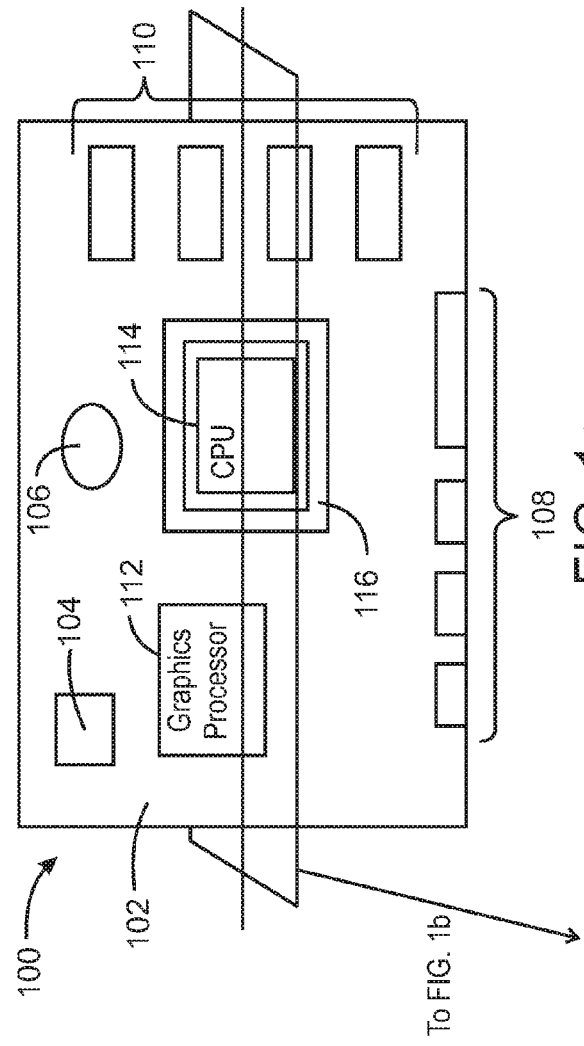
FIG. 1a is a top view illustration of an example of a motherboard.
Figure 1B:
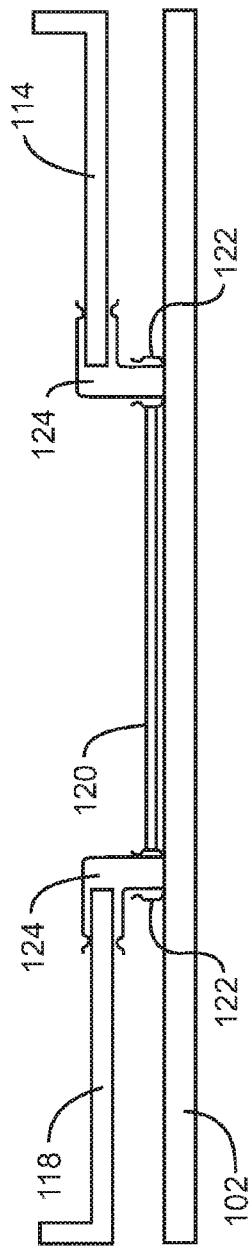
FIG. 1b is a cutaway side view illustration of an example of a motherboard.

FIG. 1a is a top view illustration of an example of a motherboard and FIG. 1b is a cutaway side view illustration of an example of the motherboard. The motherboard 100 can include a printed circuit board (PCB) 102. A plurality of components can be electrically coupled to the PCB 102. The examples of components include a BIOS chip 104, a backup battery 106, peripheral connectors 108, such as universal serial buses (USBs), serial ports, parallel ports, audio ports, ethernet ports, etc., memory 110, and a graphics processor 112, among others.

The motherboard can also include a central processing unit 114 and a CPU fan and heat sink 116. The central processing unit 114 can include a single processor or a plurality of processors. The processor(s) can include any suitable type of processor. The CPU 114 can be coupled to a component 118. The component 118 can be one of components 104-112 or any other components not listed. Additionally, while the CPU 114 is shown here coupled to a single component 118, the CPU 114 can be coupled to multiple components.

The CPU 114 can be coupled to the component 118 via a cable 120. The cable 120 can be installed on the PCB 102 before the CPU 114 is installed. Further, the cable 120 can be installed before any of components 104-118 are installed. A socket 122 can be coupled to the cable 120. The socket 122 can be coupled to the cable 120 through any suitable means, such as soldering or by compression. A single socket 122 or multiple sockets 122 can be coupled to the cable 120. For example, the cable 120 can include two ends and a socket 122 can be coupled to each end of the cable 120. The socket 122 can be coupled to the cable 120 before installation of the cable 120 on the PCB 102. In another example, the socket 122 can be coupled to the cable 120 after installation of the cable 120 on the PCB 102.

The socket 122 can be designed to receive an adapter 124 of any suitable type. For example, the socket 122 can be a vertical connector, as illustrated in FIG. 1. The adapter 124 can be coupled to the CPU 114 by any suitable means, such as by soldering. The adapter 124 can be coupled to the CPU 114 before installation of the CPU on the PCB 102. The adapter 124 can be designed to be received in the socket 122. For example, the adapter 124 can be a right-angled adapter, as illustrated in FIG. 1.

During installation of the CPU 114 on the PCB 102, the adapter 124 can be inserted in the socket 122. The adapter 124 and the socket 122 can create a direct connection between the CPU 114 and the cable 120. The adapter 124 and the socket 122, together, can constitute a connector that allows installation of the cable 120 on the PCB 102 before installation of the CPU 114. The connector can, in some instances, further allow the cable 120 to be installed prior to installation of some or all of the components 104-118, thereby reducing or eliminating the risk of damaging the components 104-118.

It is to be understood that the illustration of FIG. 1 is not intended to indicate that the motherboard 100 is to include all of the components shown in FIG. 1 in every case. Further, any number of additional components can be included within the motherboard 100, depending on the details of the specific implementation.

Figure 2:
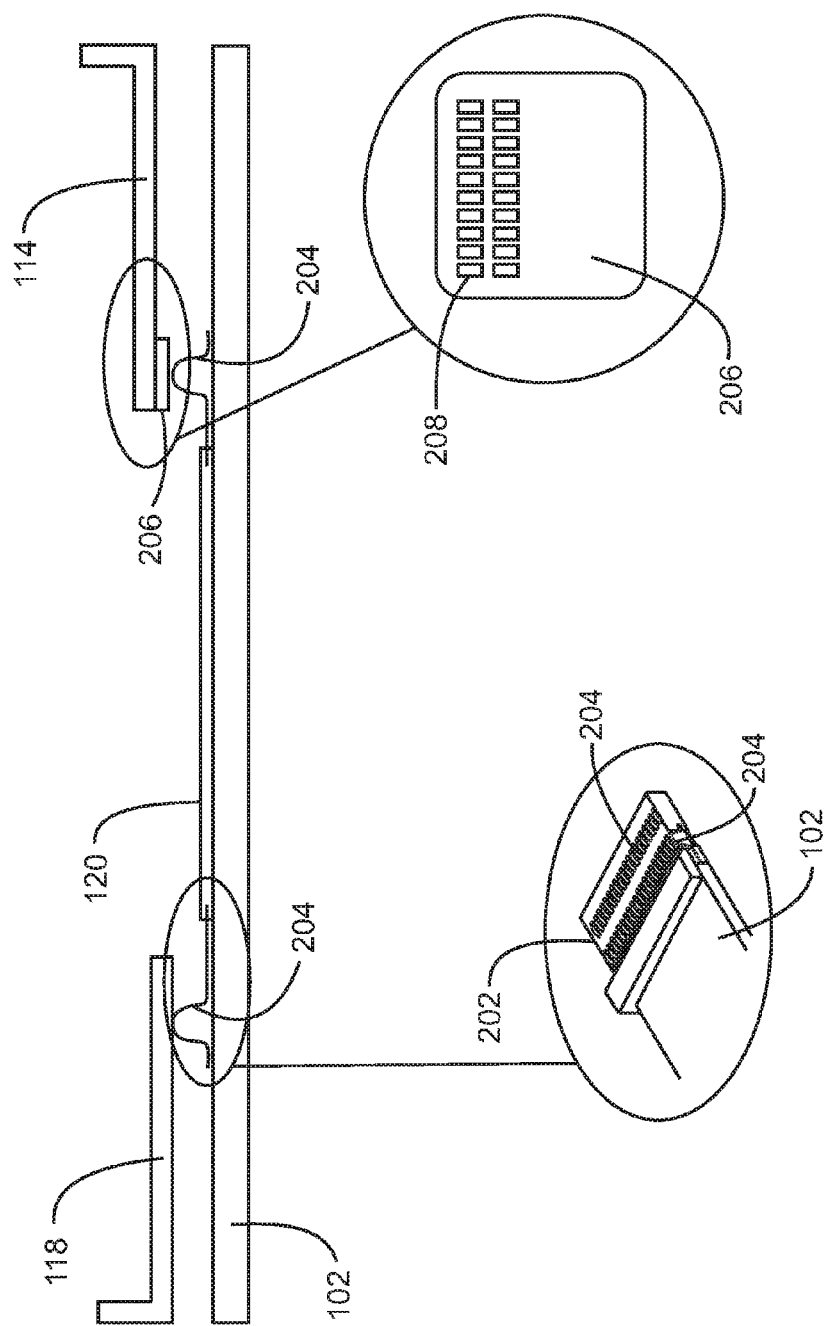
FIG. 2 is another cutaway side view illustration of an example of a motherboard.

FIG. 2 is another cutaway side view illustration of an example of a motherboard 100. The motherboard 100 includes PCB 102. A CPU 114 can be coupled to a component 118. The component 118 can be one of components 104-112 or any other components not listed. Additionally, while the CPU 114 is shown here coupled to a single component 118, the CPU 114 can be coupled to multiple components.

The CPU 114 can be coupled to the component 118 via a cable 120. The cable 120 can be installed on the PCB 102 before the CPU 114 is installed. Further, the cable 120 can be installed before any of components 104-118 are installed. A socket 202 can be coupled to the cable 120 by any suitable means, such as soldering or by compression. A single socket 202 or multiple sockets 202 can be coupled to the cable 120. For example, the cable 120 can include two ends and a socket 202 can be coupled to each end of the cable 120. The socket 202 can be coupled to the cable 120 before installation of the cable 120 on the PCB 102. In another example, the socket 202 can be coupled to the cable 120 after installation of the cable 120 on the PCB 102.

The socket 202 can be designed to receive an adapter 206. For example, the socket 202 can include a plurality of compression pins 204, such as a land grid array (LGA) of compression pins, as illustrated in FIG. 1. The socket 202 can include any suitable number of compression pins 204 and the compression pins 204 can be arranged in any suitable pattern.

The adapter 206 can be designed to be received in the socket 202. For example, the adapter 206 can include a plurality of pads 208, as illustrated in FIG. 1. The adapter 206 includes a number of pads 208 equal to the number of compression pins included in the socket 202 and the pads 208 can be arranged in a pattern corresponding to the pattern of the compression pins 204.

The adapter 206 can be coupled to the CPU 114 by any suitable means. In an example, the adapter 206 can include the compression pads 208 and can be coupled to the CPU 114, such as by soldering. In another example, the adapter 206 can include the compression pads 208 directly connected to a surface of the CPU 114. The adapter 206 can be coupled to the CPU 114 before installation of the CPU 114 on the PCB 102.

It is to be understood that the illustration of FIG. 2 is not intended to indicate that the motherboard 200 is to include all of the components shown in FIG. 2 in every case. Further, any number of additional components can be included within motherboard 200, depending on the details of the specific implementation.

Figure 3:
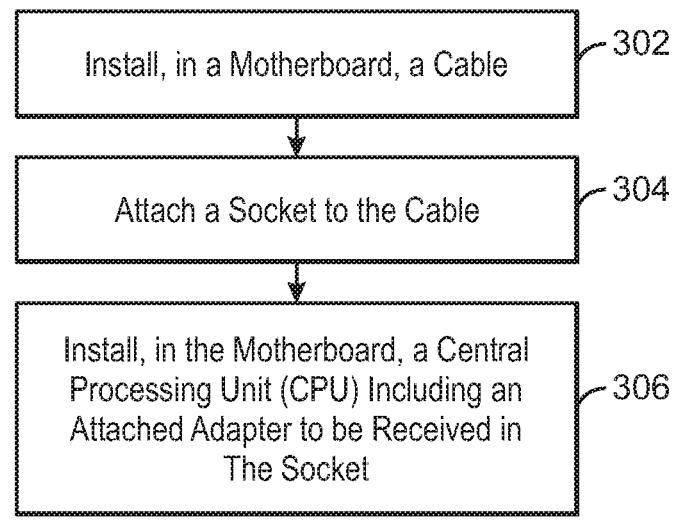
FIG. 3 is a process flow diagram of an example of a method of installing a central processing unit.

FIG. 3 is a process flow diagram of an example of a method of installing a CPU. The method can begin at block 302 with installing, in a motherboard, a cable. The cable can be designed to connect to a CPU and can connect the CPU to another component. For example, the cable can connect the CPU to another CPU. In another example, the cable can connect the CPU to an input/output (I/O) device. The cable can be any type of cable designed to connect to the CPU, such as a flexible printed copper cable or a discrete wire. In an example, the cable can be a high-speed cable.

At block 304, a socket can be coupled to the cable. The socket can be coupled to the cable by any suitable method, such as by soldering or compression. In an example, the socket can be coupled to the cable before installation of the cable in the motherboard. The socket can be any type of socket. For example, the socket can be a vertical connector. In another example, the socket can be a land grid array (LGA) of compression pins.

The cable can include more than one socket. For example, the cable can include two ends and two sockets, one socket coupled to each end of the cable. Further, the socket can include more than one type of socket. For example, in a cable with a socket coupled to each end of the cable, a first socket can be a first type of socket, such as a vertical connector, and a second socket can be a second type of socket, such as an array of compression pins.

At block 306, a central processing unit (CPU) can be installed in the motherboard. The CPU includes a coupled adapter. The adapter is designed to be received in the socket during installation of the CPU in the motherboard. For example, the adapter can be a right-angled adapter received in a vertical connector socket. In another example, the adapter can be an array of pads arranged in a pattern corresponding to the land grid array (LGA) of compression pins of the socket.

It is to be understood that the process flow diagram of FIG. 3 is not intended to indicate that the method 300 is to include all of the blocks shown in FIG. 3 in every case. Further, any number of additional blocks can be included within the method 300, depending on the details of the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A motherboard, comprising:
   a printed circuit board;
   a socket connected to the printed circuit board by at a first connection, the socket comprising a vertical connector;
   a cable connected to the socket at a second connection separate and independent of the first connection; and
   an adapter coupled to a central processing unit (CPU) and received in the socket upon installation of the CPU in the motherboard, the adapter comprising a right-angled adapter that is received in the vertical connector,
   wherein the cable and socket are installed in the motherboard prior to installation of the CPU.

2. The motherboard of claim 1, wherein installation of the cable in the motherboard after installation of the CPU is eliminated.

3. The motherboard of claim 1, wherein the socket comprises a land grid array (LGA) of compression pins and the adapter comprises pads arranged in a land grid array (LGA) corresponding to the LGA of compression pins.

4. The motherboard of claim 1, wherein the socket and adapter comprise a direct connection between the cable and the CPU.

5. The motherboard of claim 1, wherein the socket is soldered to the cable.

6. The motherboard of claim 1, wherein a socket is coupled to each end of the cable.

7. The motherboard of claim 1, wherein the first connection extends along a first side of the socket facing in a first direction parallel to the printed circuit board and wherein the second connection extends along a second side of the socket facing in a second direction perpendicular to the printed circuit board.

8. A method, comprising:
   installing, in a motherboard, a cable;
   attaching a socket to the cable along a first side of the socket facing in a first direction parallel to the motherboard;

attaching the socket to the motherboard along a second side of the socket facing in a second direction perpendicular to the motherboard; and installing, in the motherboard, a central processing unit (CPU) comprising an adapter to be received in the socket during installation of the CPU;

wherein the socket comprises a vertical connector and the adapter comprises a right-angled adapter that is received in the vertical connector.

9. The method of claim 8, wherein the socket is coupled to the cable before installing the cable.

10. The method of claim 8, wherein the socket comprises a land grid array (LGA) of compression pins and the adapter comprises pads arranged in a land grid array (LGA) corresponding to the LGA of compression pins.

11. The method of claim 8, wherein receiving the adapter in the socket connects the cable directly to the CPU.

12. The method of claim 8, comprising installing the cable in the motherboard before installing the CPU.

13. The method of claim 8, comprising installing the right-angled adapter in the vertical connector.

* * * * *